US005317135A

United States Patent [19]

Finocchio

[11] Patent Number: 5,317,135

[45] Date of Patent: May 31, 1994

[54] METHOD AND APPARATUS FOR VALIDATING INSTANT-WIN LOTTERY TICKETS

[76] Inventor: Richard Finocchio, 46 Dartmouth St., Everett, Mass. 02149

[21] Appl. No.: 705,332

[22] Filed: May 24, 1991

[51] Int. Cl.[5] .......... G06F 15/44

[52] U.S. Cl. .......... 235/375; 364/412

[58] Field of Search .......... 235/375, 380, 382, 437; 273/139; 364/412

[56] References Cited

U.S. PATENT DOCUMENTS

| | | | |
|---|---|---|---|
| 3,890,599 | 6/1975 | Simjian | 340/825.34 |
| 4,157,829 | 6/1979 | Goldman et al. | 273/138 A |
| 4,669,729 | 6/1987 | Solitt et al. | 273/139 |
| 4,677,553 | 6/1987 | Roberts et al. | 364/412 |
| 4,707,592 | 11/1987 | Ware | 235/380 |
| 4,833,307 | 5/1989 | Gonzalez-Justiz | 235/375 |
| 4,858,123 | 8/1989 | Alexoff et al. | 364/412 |
| 4,949,256 | 8/1990 | Humble | 364/401 |
| 5,080,364 | 1/1992 | Seidman | 273/139 |

FOREIGN PATENT DOCUMENTS

| | | |
|---|---|---|
| 0173835 | 3/1986 | European Pat. Off. . |
| 0354260 | 2/1990 | European Pat. Off. . |
| 8603310 | 6/1986 | PCT Int'l Appl. . |
| 2148135 | 5/1985 | United Kingdom . |
| 2226252 | 6/1990 | United Kingdom . |

OTHER PUBLICATIONS

Massachusetts State Lottery, "On-Line Instant Ticket Validation System" Handout at Association of International Lotteries Conference, Seville, Spain, Jun. 3, 1990.

"Use of Bar Codes and Scanners for Instant Ticket Validation" Public Gaming Magazine, May 1989.

*Primary Examiner*—Samuel A. Turner

*Assistant Examiner*—Edward H. Sikorski

[57] ABSTRACT

The status ('paid' or 'not yet paid') of each ticket to be validated is stored in the main memory of a computer, and a flag indicating whether the ticket is valid, the ticket amount and information necessary to locate the status information for the ticket is encoded into a validation number which is printed on each ticket. When the ticket is presented for validation, the encoded information on the ticket is read, forwarded to the computer and decoded into a status flag, the ticket amount and the status location. The status flag is then checked to determine if the ticket is valid; if it is, the decoded information regarding the status is used to locate the status information in the computer memory and change the status to 'paid' so that the ticket cannot be cashed again.

12 Claims, 3 Drawing Sheets

METHOD AND APPARATUS FOR VALIDATING INSTANT-WIN LOTTERY TICKETS

FIELD OF THE INVENTION

This invention relates to methods and apparatus for validating tickets and, in particular, to computer-controlled methods and apparatus for cashing instant-win lottery tickets.

BACKGROUND OF THE INVENTION

"Instant win" lottery tickets are now in widespread use in many areas. These tickets consist of a game card that has a game play area printed thereon with a number of predetermined spot that are covered with thin, opaque latex coatings. The card usually contains a separate area on which a back-up verification code is printed, which area is also covered by a latex coating. This latter area is usually marked "VOID IF REMOVED" and the card will not be honored if any part of the overlying coating has been removed prior to redemption.

The cards are sold over the counter in retail establishments and the purchaser selectively removes some of the coatings with a coin or other implement to reveal the underlying information. Depending on the game mechanics, the purchaser must match or "beat" other printed areas on the card to determine whether the card is a "winner". If the card is a winner, it can be immediately cashed by presentation to an agent in an establishment that sells the cards to obtain a predetermined cash award.

In many prior art cases, validation of winners was performed manually. After the card was presented for cashing, the agent followed the game mechanics to determine the winning value. Usually, in such cards, the amount of the win is printed somewhere on the face of the card. Next, the agent obtained a verification code generally located under one of the latex coatings in the game play area to verify the prize amount. The agent then removed the latex coating in the "VOID IF REMOVED" area of the ticket to reveal the backup verification code, and, if the backup code matched the verification code, the ticket was deemed validated. In some cases, for example, for relatively large cash prizes, the agent was also required to telephone a central lottery administration office and provide the ticket validation number, in order to obtain final authorization to pay the prize.

Once a ticket had been cashed, it had to be returned to the lottery administration so that a final validation could be made and the agent given final credit for the prize payment. Accordingly, it was common practice for an agent to accumulate paid winning cards and separate them by prize amounts. The number of winners for each amount was tallied and entered on a settlement sheet. Bundles of paid winning tickets were then placed in a settlement bag and the bag number was entered on the settlement sheet. At the selling establishment, a lottery field representative checked a settlement sheet and locked the settlement bag to prevent fraud. A courier hired by the lottery then transported the locked settlement bag to the central lottery office for validation. After being validated, the paid tickets were then destroyed.

Although the aforementioned system worked, there were significant accounting and ticket handling burdens for the selling agents and the system was prone to clerical errors. In addition, there were potential problems with illegal activities including cashing of altered tickets, theft of paid tickets from the selling establishments, and the cashing of stolen tickets.

Accordingly, computerized cashing apparatus was developed so that tickets could be validated by a central computer. In this scheme, each ticket selling establishment has a remote computer terminal connected to the central computer. In addition to the regular information described above a computer-readable code was printed on the lottery tickets, which code that identified each ticket uniquely to the computer. Usually this code was in a bar-code form and bar code scanners attached to the remote terminal were used to read the code, the information in the code was then forwarded to the central computer for validation.

With such a system, information required to validate a ticket was stored in the central computer on a disk memory. Therefore, when a ticket was redeemed, the ticket could be marked as paid in the central computer and the ticket could not be cashed again. Further, the ticket did not need to be physically returned to the central lottery location to be destroyed. This latter system removed the incentive for attempting to cash altered or stolen tickets and for stealing paid tickets from the selling locations in order to cash them again. It also reduced clerical errors, improved agent controls and significantly reduced the accounting and handling burden for the selling agents. The computerized records also provided the lottery with more timely and accurate information relating to winners.

However, problems remained with system response time. In many lottery systems, the total number of tickets processed by the system can be thousands to hundreds of thousands of tickets per day. In some systems, information for each ticket was stored in a large disk file and the remote terminal at the agent's location was used to access the disk at the time of ticket redemption while the winning purchaser waited so that the ticket could be marked in the computer disk file as paid. Consequently, each ticket validation required an on line access to the disk file to determine if the ticket was a winner and whether it had already been paid. If the ticket was an unpaid winner, a subsequent disk access had to be made to mark the winning ticket as paid. With this type of system, the large volume of disk transactions caused long delays in response resulting in selling agent and ticket purchaser frustration and in consequent loss of ticket sales.

In order to improve response time, other prior art systems stored information regarding tickets in the main memory of the central computer. In this latter system, the validation number on the ticket is used to access the main memory locations so that no disk accesses are necessary to validate a ticket. However, the main memory necessary to accommodate information for all of the tickets quickly becomes prohibitively large for any reasonably-sized lottery system.

Still other prior art systems store information in the computer main memory for only those winning tickets which have small awards. In these latter systems, the lottery tickets are printed in numbered packs or books and the book number is encoded into the validation number printed onto each ticket in the book. The validation number is read off the ticket during the validation procedure and forwarded to the central computer, where the validation number is decoded to determine the location in the main memory at which the winning ticket information is located. However, it was still necessary to access a disk file to determine the prize value in the case of small amount winning tickets or to determine if a non-small amount winning ticket was a large amount winning ticket. Consequently, disk accesses were necessary for each ticket scanned into the system. Nevertheless, this system reduced the number of disk accesses required to process a winning ticket because, after a ticket was determined to be a winning ticket, the ticket could be marked as paid without the necessity of a further disk access. Therefore, system response time was reduced, but when a large number of tickets were being cashed, the system response was still slow.

Accordingly, it is an object of the present invention to provide a ticket validating apparatus and method which minimizes the time taken to validate a ticket.

It is another object of the present invention to provide a ticket validating apparatus and method in which most tickets can be validated without accessing a disk file.

It is still another object of the present invention to provide a ticket validating apparatus and method in which sufficient information to validate most tickets is encoded into the ticket validation number.

It is yet another object of the present invention to provide a ticket validating apparatus and method which is suitable for cashing instant-win lottery tickets and which can accommodate various lottery ticket structures.

It is a further object of the present invention to provide a ticket validation apparatus and method which can disable stolen tickets and prevent them from being validated.

It is still a further object of the present invention to provide a ticket validation apparatus and method which can quickly check for agent fraud.

It is yet another object of the present invention to provide a ticket validation apparatus and method which greatly reduces selling agent and central administration accounting burdens.

It is still another object of the present invention to provide a ticket validation apparatus and method which eliminates the need to return paid tickets to the central location for destruction.

It is another object of the present invention to provide a ticket validation apparatus and method which improves the overall accounting of ticket validation by providing accurate reports and analyses.

SUMMARY OF THE INVENTION

The foregoing problems are solved and the foregoing objects are achieved in one illustrative embodiment of the invention in which the status of each ticket is stored in the central computer's main memory and a flag indicating whether the ticket is valid, the ticket amount and information necessary to locate the status information for the ticket is encoded into each ticket's validation number.

When the ticket is presented at a remote terminal, the encoded information on the ticket is decoded and forwarded to the central computer. In the central computer, the validation number is further decoded into a status flag, the amount and the status location. The status flag is then checked to determine if the ticket is valid; if it is, information may be returned to the agent instructing him to pay the amount which was decoded from the validation number. In addition, the decoded information regarding the status is used to locate the status information and change the status to paid so that the ticket cannot be cashed again.

If the decoded winner flag indicates that the ticket is not valid, a disk file is accessed using the validation number as an address to determine if the ticket is valid. If so, the agent is instructed to pay the appropriate amount. If not, an improper entry of a non-winning ticket has been made and a record is kept of the improper entries is kept in order to spot agent fraud and reduce unnecessary use of system resources.

Information regarding additional ticket status, such as whether the ticket is a stolen ticket and whether the ticket has been initialized or activated can also be stored with the status and used to further control ticket cashing to reduce fraud and illegal cashing activity.

DETAILED DESCRIPTION OF THE PREFERRED EMBODIMENT

Figure 1:
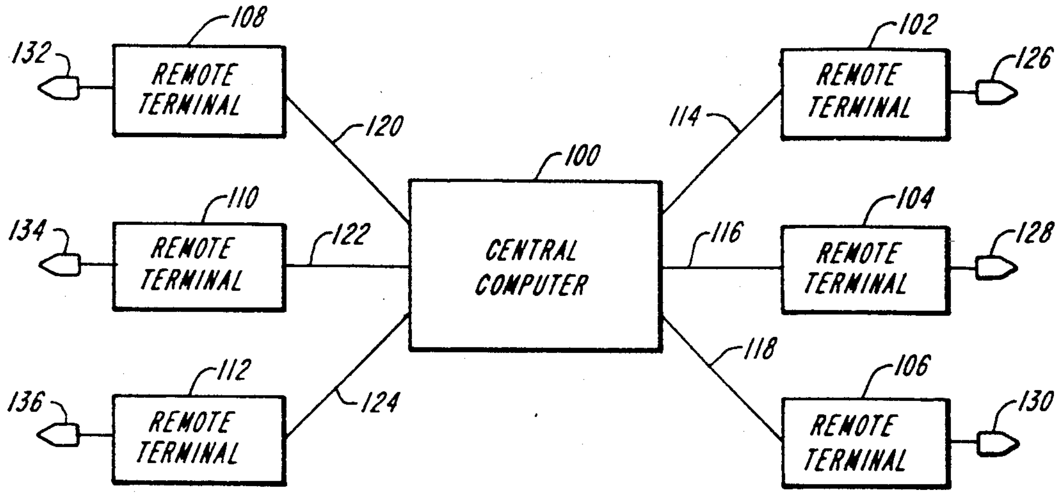
FIG. 1 is a schematic block diagram of a lottery ticket cashing system with a central computer and remote terminals.

In the description below, the invention is described in reference to an instant win lottery ticket cashing method. However, the invention can also easily be applied to methods for cashing retail promotion tickets and food store coupons, and, accordingly, the description below should not be considered as limiting. FIG. 1 is a schematic illustration of a distributed lottery ticket cashing system which utilizes a plurality of remote terminals to gather ticket information and forward such information to a central computer which keeps track of paid tickets.

More particularly, remote terminals 102–112 may be located at a retail establishments, shops, restaurants, supermarkets, or other places in which it is desired to validate or cash tickets or coupons. Remote terminals 102–112 are of conventional design and each terminal is comprised of a microprocessor operating under control of software or firmware to acquire ticket information, format the information and transmit the information over datalinks 114–124 to central computer 100.

Datalinks 114–124 may be any conventional data transmission devices such as dedicated telephone lines, dial-up telephone lines, dedicated data lines or other conventional data transmission means. Terminals 102–112 are connected to datalinks 114–124 by means of modems or other well-known data transmission devices.

Central computer 100 receives information from all remote terminals, maintains information regarding the paid status of all winning tickets and compiles and generates reports on the overall operation of the system.

Each remote terminal, such as remote terminal 102, is equipped with a scanning device 126. Various conventional scanning devices can be used to read encoded information printed on the tickets or coupons. Devices which are suitable for use with the invention include light wands or light pens, slot readers, charge-coupled device readers (CCD readers) and laser scanners. The scanning devices read information from each of the tickets or coupons by scanning a pre-printed portion of the ticket. A common, well-known scanning device, which is preferred for use with the invention, is a bar code scanner. With such a scanning device, digits representing a ticket validation code are printed on each ticket in the form of a well-known and conventional bar code.

In accordance with the invention, the information read from each ticket can be forwarded to the central computer 100 and processed in real-time with a minimum of delay. Therefore, computer 100 can quickly return a message back to terminal 102 indicating whether or not the ticket or coupon is valid, whether the ticket has been previously cashed and the amount of any prize to be paid. Since central computer 100 also updates a master memory file to indicate the ticket has been cashed, a consistent set of records regarding payment is automatically maintained so that paid tickets cannot be cashed again. Consequently, the inventive method completely eliminates the cashing of fraudulent or modified tickets. It also eliminates the need for telephone calls to the central location to validate the tickets, and eliminates the need for a physical return of paid tickets to the central location for destruction.

Figure 2:
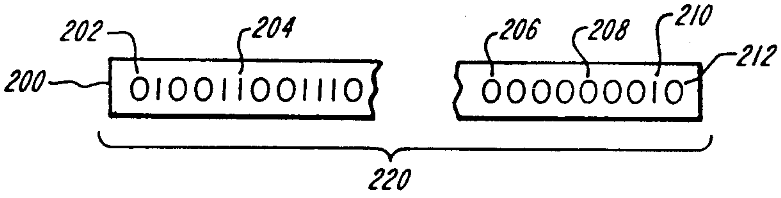
FIG. 2 is a schematic illustration of the computer memory record for a ticket book.

The form of the information stored in the master memory file is shown in schematic form in FIG. 2. The information is stored directly in the computer's main memory in order to eliminate time-consuming disk accesses. The form of the information depends on the structure of the game or coupon cashing scheme, but generally information on only some of the tickets is stored to reduce the information which must be stored to a minimum. Illustratively, for an instant-win lottery game, only information relating to certain winning tickets may be stored in the computer main memory.

For example, a common instant-win game structure used in "instant win" game tickets called a "guaranteed low end price structure" or GLEPS. In this structure, tickets are sold to the ticket selling agents in numbered "books", with each book containing a predetermined number of tickets. Each book of GLEPS game tickets contains a predetermined number of low end, or small award, winning tickets. For example, small award winners may include awards up to, and including, ten dollars. In addition, ticket books may also contain additional winning tickets which have larger prize values and ar not part of the GLEPS structure. The ticket books are arranged in "pools" and these larger amount tickets are distributed over the ticket book pools in a truly random manner and are much less numerous than the GLEPS winning tickets.

The GLEPS tickets are encoded into the computer memory in such a manner that only information regarding GLEPS winning tickets are stored in the main memory. Each ticket is allotted one bit of memory which is used to store information regarding payment. Since each book of tickets has a predetermined number of GLEPS winning tickets, the entire book can be represented by a predetermined number of bits within the main memory. A typical game setup has approximately sixty winners. Additional bits can be used to mark the book as activated or stolen, and, therefore, each book of tickets can be represented by approximately sixty-four bits in the computers memory. Other number of bits may also be used to encode additional information or different numbers of winning tickets. The bits corresponding to each ticket book can be located by using the book number as an address into the memory location.

In particular, an illustrative memory organization for GLEPS winning tickets in one ticket book is shown in FIG. 2. In particular, each winning GLEPS ticket is assigned a particular binary bit location, such as locations 202–208, in the entire L overall book location 200. Each of bit locations 202–208 represents a single winning ticket in the book. One state of the bit, for example "zero", indicates that the associated ticket has not already been paid. The alternate state of the bit, for example "one", indicates the ticket has been paid. Thus, when each winning ticket is cashed, the corresponding bit within the stored record for the book is modified from "zero" to "one" to indicate the ticket has been cashed.

The book location 200 may also include additional bits, such as bits 210 and 212, which indicate that the book has been "activated", that is made ready for sale and that the book is not stolen as will be described in more detail hereinafter.

The bit structure 200 cannot accommodate any non-GLEPS winning tickets which may also be present in the book since the total number of such winning tickets is random per ticket book pool. Consequently, information regarding non-GLEPS winning tickets must be stored in a disk memory which can be accessed by the computer. Such a disk memory has much slower access time than the computer's main memory, but, as will hereinafter be explained, in accordance with the invention, the disk memory will only be accessed after it has been determined that a ticket is a not a GLEPS winning ticket. Since the number of GLEPS winning tickets is much greater than the number of non-GLEPS winning tickets, time-consuming disk accesses are reduced to a minimum.

The information regarding the winning tickets is stored in the computer's main and disk memories before the tickets are released for sale so that the information can be accessed in real-time when tickets are later sold and presented for cashing as will be hereinafter explained.

Figure 3A:
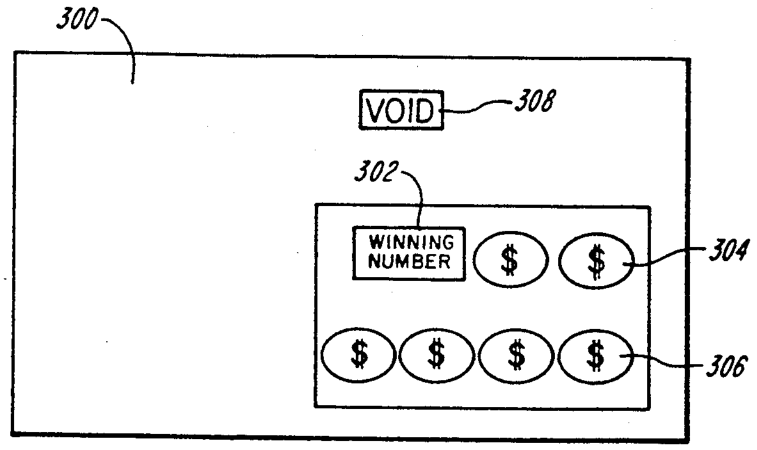
FIG. 3A is a schematic illustration of the face of an instant win lottery ticket.
Figure 3B:
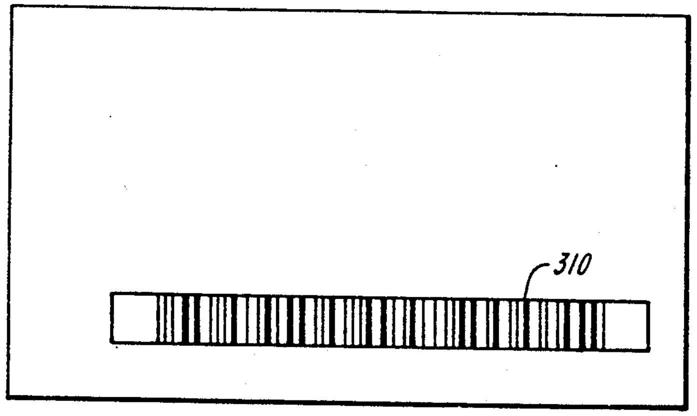
FIG. 3B is a schematic illustration of the back of the instant win lottery ticket of FIG. 3A illustrating the bar coded validation number.

FIGS. 3A and 3B illustrate the front side and back side of a typical "instant-win" lottery ticket which can be used with the present invention. As mentioned above, the inventive system can obviously be used with other types of tickets and coupons such as supermarket coupons and retail coupons. An instant-win lottery ticket such as ticket 300 typically has a game area consisting of game locations 302–306 and a verification area 308.

Game locations 302, 304 and 306 are initially covered with an opaque latex material that can be easily scratched off the ticket with a coin or other implement in order to reveal underlying printed areas. In a typical game, the ticket purchaser removes the latex coatings from a "master" area 302 and compares the underlying information to the underlying information in the other game areas 304 and 306. Depending on the comparison, the purchaser may "win" various prize amounts which are also concealed under the latex overlying the areas 304 and 306. With an instant-win ticket, such as ticket 300, the purchaser, upon determining that the ticket is a winner, can immediately present the ticket to a retail establishment selling such tickets to receive a cash payment in the amount of the prize value.

Also concealed under the latex coating overlying one of areas 302-306 is a ticket verification code. In order to determine whether the ticket is a valid winning ticket, a selling agent, upon receiving a ticket presented for payment, passes the ticket through the scanning device located in a nearby remote terminal to initiate the validation procedure. As described in detail below, coded information printed on the ticket is transmitted to the central location. The agent may then be required to enter the verification code, or a portion of the verification code, into the terminal in some cases, for example, for prize amounts larger than a predetermined value. The agent then removes the latex coating in verification area 308 to uncover the verification code and enters the code into the terminal. The validation procedure is then completed at the central location and a message is returned to inform the agent whether the ticket is valid and the amount to be paid. In other cases, the entire verification code must be entered, for example, if the scanning device cannot read the information printed on the ticket due to malfunction or damage to the printed information.

As mentioned previously, a validation code which contains validation information is printed on the ticket. FIG. 3B shows the back of ticket 300 including bar-code-encoded validation code 310. When ticket 300 is scanned into the scanning device in the terminal, bar code 310 is read by the scanning device and converted into a multiple-digit number. A number of different bar codes are suitable for use with the invention. These include universal product codes, code 39, CODABAR, code 128 and an interleaved 2 of 5 code. In the preferred embodiment, the interleaved 2 of 5 version is used. Standard stop and start characters are used in a fixed length code of 16 characters which contains fourteen data digits and two check digits. The check digits are used by the scanning device to verify a correct read of the data digits. The combination of the fixed length code and check digits eliminates misreads by the scanning equipment. Of course, a validation code with other numbers of digits and checking arrangements could also be used without affecting the operation of the invention. Similarly, the processing of the number as described below is only exemplary.

Figure 4:
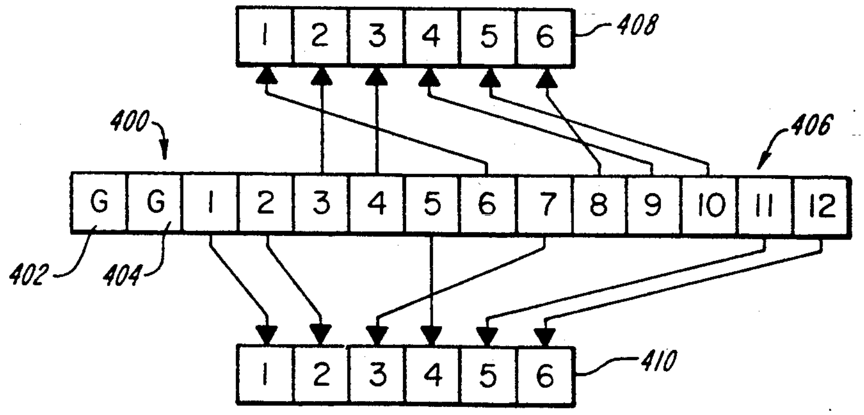
FIG. 4 is a schematic flow diagram for the decoding of the bar-code number into a validation number and a book number.

FIG. 4 illustrates the multiple digit validation code 400 which is produced by the scanning device from the bar code on the back of ticket 300. Fourteen data digits have been shown and the two check digits have been omitted for clarity. The validation code is arranged with two game digits 402 and 404 indicating the type of game or coupon and a twelve-digit validation code 406.

In accordance with the invention, the validation code contains information indicating whether the corresponding ticket is a GLEPS winning ticket, the prize amount of the ticket and an offset number that identifies the particular bit in the ticket book area in memory at which the pay status information is stored. This form of this information is discussed in detail below.

The validation code containing the above information is scrambled and encrypted in order t prevent fraudulent reading of the number before it is printed on the back of each ticket. When the ticket is presented for cashing and the bar-coded scrambled and encrypted code is read from the ticket, firmware within the remote terminal unscrambles the encrypted validation code 406 into an encrypted validation number 408 and an encrypted book number 410.

As illustrated in FIG. 4, this unscrambling is done by a simple transposition of the digit locations. For example, digit one of code 406 may be transposed to become digit one of encrypted book number 410. Similarly, digit two of code 406 becomes digit number two of book number 410. However, digit seven of validation code 406 becomes digit three of book number 410, whereas digit three of code 406 becomes digit number two of encrypted validation number 408. A typical transposition arrangement is illustrated by the arrows shown in FIG. 4, although other transposition arrangements are equally satisfactory for the present invention. The transposed, but still encrypted numbers 408 and 410 are then transmitted from the remote terminal, via the datalink, to the central computer, as previously discussed.

Figure 5:
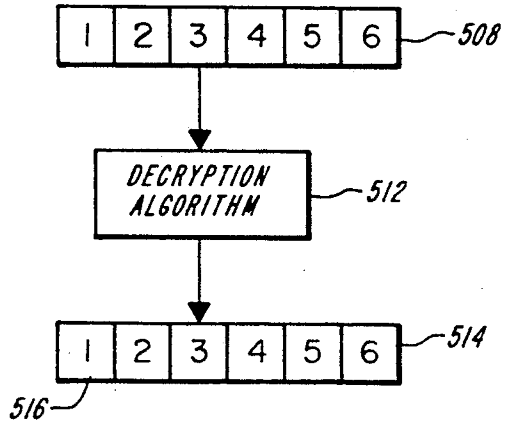
FIG. 5 is a schematic flow diagram of the processing of a decrypted validation number into a real validation number.

FIG. 5 schematically illustrates further processing of the encrypted validation number at the central computer location. In particular, the six-digit encrypted validation number 508 is applied as an input to a decryption algorithm 512 to produce a six digit "real" validation number 514. The decryption algorithm 512 may be any one of a variety of conventional encryption/decryption algorithms which accept a six-digit number as an input and produces a different six-digit number as an output in accordance with a predetermined "key" which is kept secret by the lottery authority.

Figure 6:
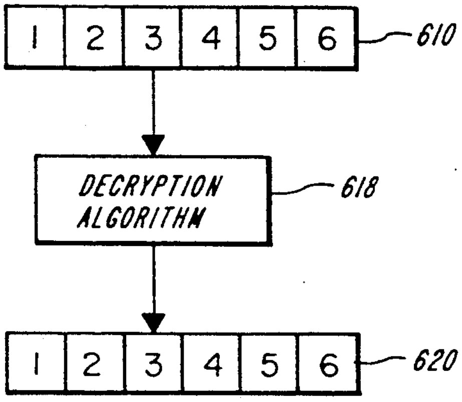
FIG. 6 is a schematic flow diagram of the processing of a decrypted book number into a real book number.

FIG. 6 indicates processing of the encrypted book number in order to decrypt the book number to produce a "real" book number. In particular, the six digit encrypted book number 610 is applied to a decryption algorithm 618 which produces a six-digit "real" book number 620. The decryption algorithm 618 may be the same a decryption algorithm 512 or may be different. After both the encrypted book number and encrypted validation number have been decrypted, the numbers are used to access the previously-stored information to validate the ticket.

However, in accordance with the invention, in order to increase processing speed, sufficient information is encoded into the validation number to enable validation of most tickets without requiring a disk access. In particular, the validation number includes a flag which indicates whether or not a particular ticket is a GLEPS winner, the prize value and an offset number which identifies the particular bit of the book record which corresponds to the ticket. Other information may also be encoded into the validation number such as information indicating dates between which the ticket is valid for time-limited promotions, geographical areas in which the ticket is valid, store identifications, selling agent identification numbers and zip codes.

The flag that indicates whether the ticket is a GLEPS winner may consist of a single digit, for example digit 516 of decrypted validation word 514. Alternatively, other schemes can be used to determine whether the ticket is a GLEPS winner. For example, GLEPS winner status may be identified by the value of a digit such as digit 516—if it is not greater than a predetermined amount, the ticket is a GLEPS winner.

Figure 7:
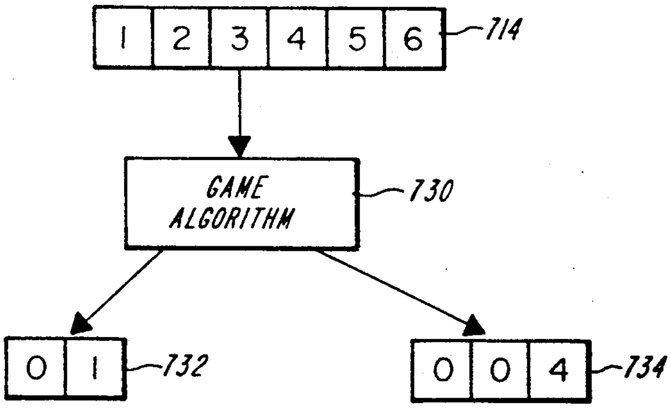
FIG. 7 is a schematic flow diagram of the processing of the decrypted validation number into a prize value and an offset number.

If the GLEPS winner flag indicates that the particular ticket under consideration is a GLEPS winner, then further processing is done to the validation number to additional as shown in FIG. 7. In FIG. 7, validation number 714 is applied to a game algorithm 730 which extracts a prize value 732 and an offset number 734. Additional information may also be extracted at this time. Game algorithm 730 may be any straightforward algorithm which generates the additional information or may simply partition the validation number into two groups corresponding to the prize value 732 and the offset number 734.

Once the prize value has been decoded, it can then be immediately re-transmitted back to the remote terminal in order to inform the selling agent the amount of prize to pay. This re-transmission eliminates attempts to cash altered tickets and to re-cash previously-paid tickets.

The main memory record which contains information for the book of tickets is accessed by using the decrypted book number as an address or as an input to generate an address. Once the record is located, offset number 734 is used to determine which of the bits 220 in FIG. 2 in the book record is to be modified from a "zero" to a "one" to indicate that the ticket has been paid. The offset number may simply indicate the bit position starting from the left- or right-hand side of the word at which the desired bit is located or may indicate the bit position in some other manner. This identified bit is then changed to indicate that the ticket has been paid.

Figure 8:
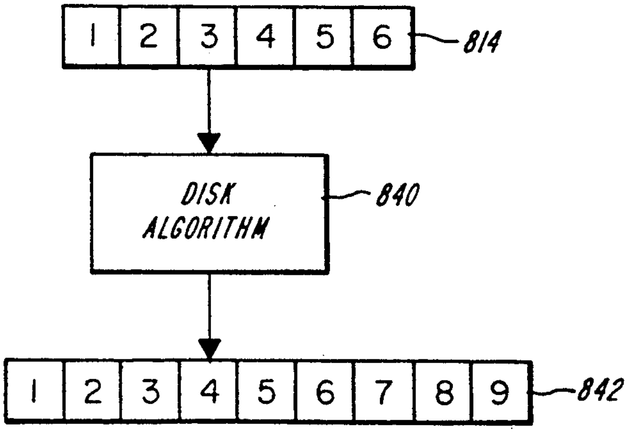
FIG. 8 is a schematic flow diagram of the processing of the decrypted validation number into a disk address.

If the winner flag indicates that the ticket is not a GLEPS winner, then an additional step, set forth in FIG. 8 is performed. In particular, the validation number 814 is applied to a disk algorithm 840. The disk algorithm converts the six-digit validation number into another multiple digit disk address 842. Nine digits are shown as an example, but other schemes could also be used. The resulting disk address is then used to access a computer disk containing files of non-GLEPS winners. If a record is found at the disk address, the record is retrieved and the status information in the record is examined to determine if this ticket has been previously paid. If the ticket has not been paid, a prize amount also stored in the record is returned to the selling agent. The ticket information is then modified to indicate that the ticket has been paid and the record is re-written. If no record is found at the computed address, the ticket is deemed a loser.

The inventive system can record cashing information passing through the system to help identify agent fraud and other illegal activities. For example, a record can be kept of the number of non-winning tickets entered by a particular agent. A large number of these entries may indicate that the agent is scanning unsold tickets through the remote terminal in an attempt to cash winning tickets for himself.

In addition, the information stored in the computer memory may be used to control books of tickets. For example, as mentioned above, a book activation bit can be included in the book memory record. A special activation sheet can be included with each book of tickets containing an activation validation code. When a book of tickets is to be "activated" for sale, the selling agent scans the information on this sheet into the terminal. Sufficient information can be encoded into the validation number printed on the ticket to identify terminals in a particular selling agent location. Consequently, the ticket book can only be activated from selected terminals and a secret "log-on" code known only to the agent is necessary to turn the terminals on. The central computer, upon receiving the activation validation code, sets the activation bit in the book record. The activation bit can be checked by the central computer during the ticket validation process and the ticket will only be validated if it has been activated. Therefore, if a book of tickets is stolen before activation, this fact can be detected when attempts are made to cash tickets from the book and appropriate action can be taken.

Similarly, an additional bit can be used to indicate that a book has been stolen after it has been activated. This bit can be set by officials at the central location when an agent calls in and indicates that books have been stolen. Again, attempts to cash tickets from a stolen book can be immediately detected.

Although only one embodiment of the present invention has been described in detail, other modifications and embodiments will be immediately apparent to those skilled in the art. For example, the ticket cashing scheme is obviously applicable to coupons and other ticket validation arrangements in which a ticket or coupon must be cashed at a remote location. In these arrangements, the bar code similar to that described above can be printed on the ticket, which bar code can then be scanned at the remote terminal for validation purposes. If the bar code is used in conjunction with memory-resident information, the ticket can then be immediately invalidated so that it cannot be re-cashed. Other modifications and changes within the spirit and scope of the invention will also be readily apparent t those skilled in the art. These modifications and changes are intended to be covered by the scope of the following claims.

What is claimed is:

1. A method for cashing instant-win lottery tickets, some of said tickets being winning tickets with a predetermined prize value and some of said tickets being non-winning tickets, by means of a computer system having a main memory and a disk memory, said method comprising the steps of:

A. storing information for at least some of said winning tickets in said computer main memory at a predetermined location and storing information for others of said winning tickets in said computer disk memory at a predetermined location;

B. printing a validation code on each of said tickets, said validation code comprising a flag indicating whether said each ticket is a winning ticket with sufficient information contained within said validation code to cash said each ticket, said sufficient information including the prize value of said each ticket and information identifying said predetermined computer main memory location;

C. reading said validation code from a ticket presented for cashing at a validation location;

D. partially decoding said validation code read from said presented ticket;

E. reading said flag from said partially decoded validation code;

F. decoding a predetermined portion of said validation code and accessing said predetermined computer main memory location using said identifying information to mark said presented ticket as cashed only when said flag indicates said presented ticket is a winning ticket with sufficient information contained within said validation code to cash said presented ticket;

G. decoding a predetermined portion of said validation code to determine a disk address when said flag indicates that said presented ticket is a ticket with insufficient information contained within said validation code to cash said presented ticket; and H. accessing said computer disk memory using said disk address to locate said additional ticket status information to determine if said presented ticket is a winning ticket.

2. A method for validating a printed ticket according to claim 1 wherein step F further comprises the steps of:

F1. modifying said stored ticket information in said predetermined computer main memory location to indicate that said ticket has been cashed.

3. A method for validating a printed ticket according to claim 1 wherein step H further comprises the steps of:

H1. modifying said additional ticket status information in said computer disk memory to indicate that said ticket has been paid.

4. A method for validating a printed ticket according to claim 1 wherein step B comprises the steps of:

B1. composing a validation code for each of said tickets, said validation code comprising a flag indicating whether said each ticket is a winning ticket with a prize value of less than a predetermined award, information indicating the prize value of said each ticket and information identifying said predetermined computer memory location;

B2. encrypting each of said validation codes to prevent unauthorized reading; and B3. printing an encrypted validation code on each of said tickets.

5. A method for validating a printed ticket according to claim 4 wherein step D comprises the steps of:

D1. decrypting an encrypted validation code read from said presented ticket; and D2. decoding said flag from said encrypted validation code.

6. A method for validating a printed ticket according to claim 1 wherein step A further comprises the steps of:

A1. storing information only for winning tickets in said computer main memory and storing information for each winning ticket in said computer main memory at a separate predetermined location.

7. A method for validating a printed ticket according to claim 6 wherein step A1 further comprises the steps of:

A1A. designating a single bit location in said computer main memory for at least some of said winning tickets and storing in said single bit location information indicating whether said each winning ticket has been cashed.

8. In a method for validating a printed ticket, the improvement according to claim 1 wherein step A comprises the steps of:

A2. encoding into said validation code additional information which identifies ticket characteristics, but is not necessary for validating a ticket.

9. A method for validating a printed ticket according to claim 8 wherein step B comprises the step of:

B1. printing a validation code on said ticket, said validation code comprising additional information which identifies ticket characteristics, but is not necessary for validating a ticket.

10. A method for validating a printed ticket according to claim 1 wherein the validation code printed on each of said tickets comprises additional date information, geographical information and ticket selling agent information.

11. A method for cashing instant-win lottery tickets by means of a computer system having a main memory and a disk memory, said tickets being sold in a book having a book number and a game number, some of said tickets in said being winning tickets with a prize value less than a predetermined prize value greater than said predetermined prize value and some of said tickets being non-winning tickets, said method comprising the steps of:

A. storing paid information for each winning ticket with a prize value less than a predetermined prize value in said computer main memory at a location determined by said book number;

B. composing a validation code for each of said tickets, said validation code comprising information identifying said book number and said game number, a flag indicating whether said each ticket is a winning ticket with a prize value of less than a predetermined the prize value of said each ticket;

C. encrypting each of said validation codes to prevent unauthorized reading;

D. printing an encrypted validation code on each of said tickets;

E. reading said encrypted validation code from a ticket presented for cashing at a validation location;

F. decrypted an encrypted validation code read from said presented ticket;

G. decoding said decrypted validation code at a decoding location;

H. reading a validation number from said decoded validation code;

I. decoding said flag from said validation number;

J. decoding said ticket value, said game number and said book number from said validation number only when said flag indicates said presented ticket is a winning ticket with a prize value of less than a predetermined prize value;

K. returning said decoded value, said game number and said book number from said decoding location to said validation location;

L. accessing said computer main memory using said book number and said game number to modify said paid ticket information to indicate that said presented ticket has been cashed;

M. decoding said validation number to determine a disk address when said flag indicated that said presented ticket is not a winning ticket with a prize value of less that a predetermined prize value; and N. accessing said computer disk memory using said disk address to locate said additional ticket status information to determine if said presented ticket is a winning ticket when said flag indicates that said presented ticket is not a winning ticket with a prize value of less than a predetermined prize value.

12. Apparatus for cashing instant-win lottery tickets, some of said tickets being winning tickets with a predetermined prize value and some of said tickets being non-winning tickets, said apparatus comprising:

a computer system having a main memory and a disk memory;

means for storing information for each winning ticket in said computer main memory at a predetermined location;

means for printing validation code on each of said tickets, said validation code comprising a flag indicating whether said each ticket is a winning ticket with sufficient information contained within validation code to cash said each ticket, said sufficient information including the prize value of said each ticket and information identifying said predetermined computer main memory location;

means connected to said computer system for reading said validation code from a ticket presented for cashing at a validation location;

means responsive to said validation code for generating a winner flag;

means responsive to said winner flag for decoding said identifying information from said validation code and for accessing said predetermined computer main memory location only when said flag indicates said presented ticket is a winning ticket with sufficient information contained within said validation code to cash said presented ticket;

means responsive to a predetermined portion of said validation code and to said winner flag for generating a disk address when said flag indicates that said presented ticket is a ticket with insufficient information contained within said validation code to cash said presented ticket; and means responsive to said disk address for accessing said computer disk memory to locate said additional ticket status information to determine if said presented ticket is a winning ticket.

* * * * *